United States Patent
Weiner et al.

(10) Patent No.: US 9,409,513 B2
(45) Date of Patent: Aug. 9, 2016

(54) BRAKING INTENSITY INDICATOR SYSTEM INCLUDING SELECTIVE ADJUSTMENT OF BRAKE PEDAL LIGHT AND RELATED METHODS

(71) Applicant: STMICROELECTRONICS, INC., Coppell, TX (US)

(72) Inventors: Kenneth Weiner, Denton, TX (US); John Bloomfield, North Richland Hills, TX (US)

(73) Assignee: STMICROELECTRONICS, INC., Coppell, TX (US)

( * ) Notice: Subject to any disclaimer, the term of this patent is extended or adjusted under 35 U.S.C. 154(b) by 0 days.

(21) Appl. No.: 14/585,374

(22) Filed: Dec. 30, 2014

(65) Prior Publication Data

US 2016/0185283 A1    Jun. 30, 2016

(51) Int. Cl.
*B60Q 1/44* (2006.01)

(52) U.S. Cl.
CPC ........ *B60Q 1/444* (2013.01); *B60Q 1/44* (2013.01); *B60Q 1/441* (2013.01)

(58) Field of Classification Search
CPC ............................... B60Q 1/441; B60Q 1/444
See application file for complete search history.

(56) References Cited

U.S. PATENT DOCUMENTS

| | | | |
|---|---|---|---|
| 7,639,126 B2 | 12/2009 | Noh et al. | |
| 2002/0158757 A1 | 10/2002 | Stubock | |
| 2005/0040702 A1* | 2/2005 | Yen | B60Q 1/302 303/138 |
| 2006/0012471 A1* | 1/2006 | Ross, Jr. | A42B 3/0453 340/479 |
| 2007/0241874 A1 | 10/2007 | Okpysh et al. | |
| 2010/0102946 A1* | 4/2010 | Polak | B60Q 1/525 340/467 |
| 2013/0168552 A1* | 7/2013 | Tsang | G01J 1/0462 250/340 |
| 2013/0321143 A1 | 12/2013 | Boyer | |
| 2014/0354422 A1* | 12/2014 | Olson | B60Q 1/445 340/465 |
| 2015/0224922 A1* | 8/2015 | Kondou | B60Q 1/44 340/479 |

OTHER PUBLICATIONS

STMicroelectronics, "Time-of-Flight (TOF) Proximity Sensor, Ambient Light Sensor (ALS) and IR Emitter, 3-In-1 Module," Doc ID 024288 REV 4, Jan. 2014, VL6180, 4 pgs.

* cited by examiner

*Primary Examiner* — Van Trieu
(74) *Attorney, Agent, or Firm* — Allen, Dyer, Doppelt, Milbrath & Gilchrist, P.A.

(57) ABSTRACT

A braking intensity indicator system for a vehicle of a type that includes a foot operated brake pedal and at least one brake light may include a proximity sensor to be associated with the brake pedal and a controller. The controller may be configured to cooperate with the proximity sensor to determine a plurality of brake pedal positions versus time during foot operation of the brake pedal, and selectively adjust an intensity of the at least one brake light based upon the determined plurality of brake pedal positions versus time.

23 Claims, 4 Drawing Sheets

US 9,409,513 B2

BRAKING INTENSITY INDICATOR SYSTEM INCLUDING SELECTIVE ADJUSTMENT OF BRAKE PEDAL LIGHT AND RELATED METHODS

TECHNICAL FIELD

The present invention is directed to vehicles, and more particularly, to vehicles having a foot operated brake pedal and related methods.

BACKGROUND

For increased safety and driver awareness, especially during vehicle operation after dark, vehicles are generally equipped with lights. Headlights for forward illumination, parking lights, and brake pedal lights are several types of vehicle light. Brake pedal lights are generally activated when a foot operated brake pedal of the vehicle is operated.

Some break lights are activated only when the break pedal is depressed and generally do not give any indication of how quickly or how far the brake pedal is being depressed. This may result in an increased number of rear-end collisions, as a driver following behind the vehicle would be unaware of how fast or hard the brake pedal is being depressed.

To increase driver awareness, some braking systems provide an indication of intensity of braking. For example, such a braking system includes a circuit that is connected to a brake pedal position sensor in the form of a mechanical rheostat. The circuit adjusts the brightness of the brake lights based upon how far the brake pedal is depressed.

Other braking systems use an accelerometer carried by the vehicle to determine whether an acceleration exceeds a threshold. If the acceleration, for example, caused by hard braking, exceeds the threshold, then the brake lights are operated in a flashing mode. Additional improvements to braking intensity indicator systems may be desirable, for example, to increase drive awareness.

SUMMARY

A braking intensity indicator system for a vehicle of a type that includes a foot operated brake pedal and at least one brake light may include a proximity sensor to be associated with the brake pedal and a controller. The controller may be configured to cooperate with the proximity sensor to determine a plurality of brake pedal positions versus time during foot operation of the brake pedal, and selectively adjust an intensity of the at least one brake light based upon the determined plurality of brake pedal positions versus time. Accordingly, the at least one brake light may indicate how far and and/or how quickly the brake pedal is being depressed.

The proximity sensor may include an optical proximity sensor. The proximity sensor may include an infrared (IR) emitter, and an IR sensor configured to receive reflected IR radiation from the IR emitter, for example. The IR emitter may be an IR laser emitter, for example.

The proximity sensor may also include an ambient light sensor, and the controller may be configured to adjust a dynamic range of the IR sensor based upon the ambient light. The proximity sensor may be a time-of-flight sensor, for example.

The controller may be configured to determine an acceleration of the brake pedal based upon the plurality of brake pedal positions versus time. The controller may be configured to selectively adjust the intensity of the at least one brake light based upon the determined acceleration exceeding a threshold, for example.

The proximity sensor may include at least one mounting element for mounting to the brake pedal. Alternatively, the proximity sensor may include at least one mounting element for mounting in the footwell adjacent the brake pedal.

The controller may be configured to selectively adjust the intensity of the at least one brake light by at least one of adjusting a brightness, changing a color, changing a flashing frequency, and operating an additional brake light, for example.

A method aspect is directed to a method of selectively adjusting an intensity of at least one brake light of a vehicle. The method may include using a controller to cooperate with a proximity sensor associated with the foot operated brake pedal of the vehicle to determine a plurality of brake pedal positions versus time during foot operation of the brake pedal. The method may also include using the controller to selectively adjust the intensity of the at least one brake light based upon the determined plurality of brake pedal positions versus time.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
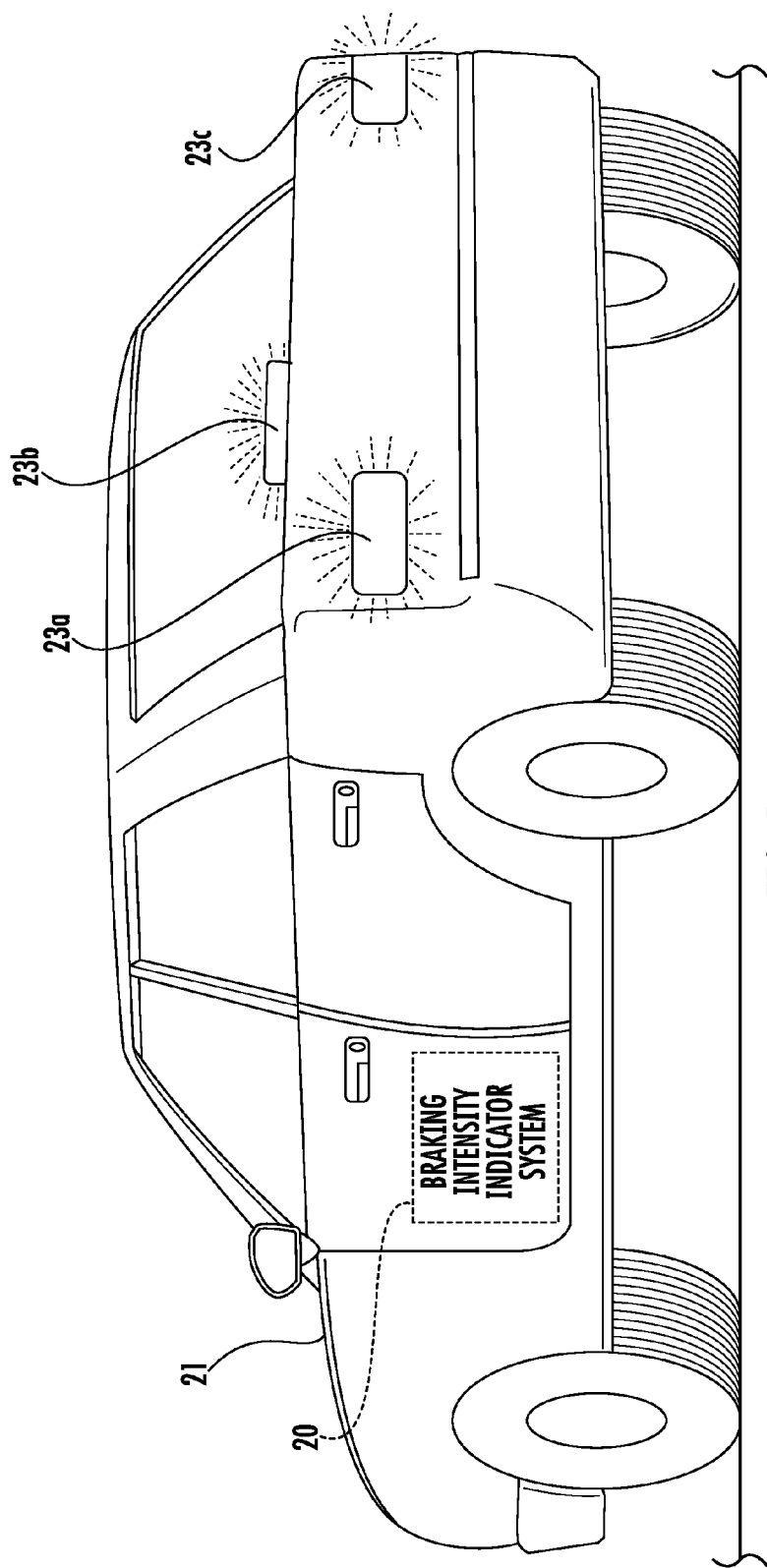
FIG. 1 is a rear perspective view of a vehicle having a braking intensity indicator system in accordance with an embodiment.
Figure 2:
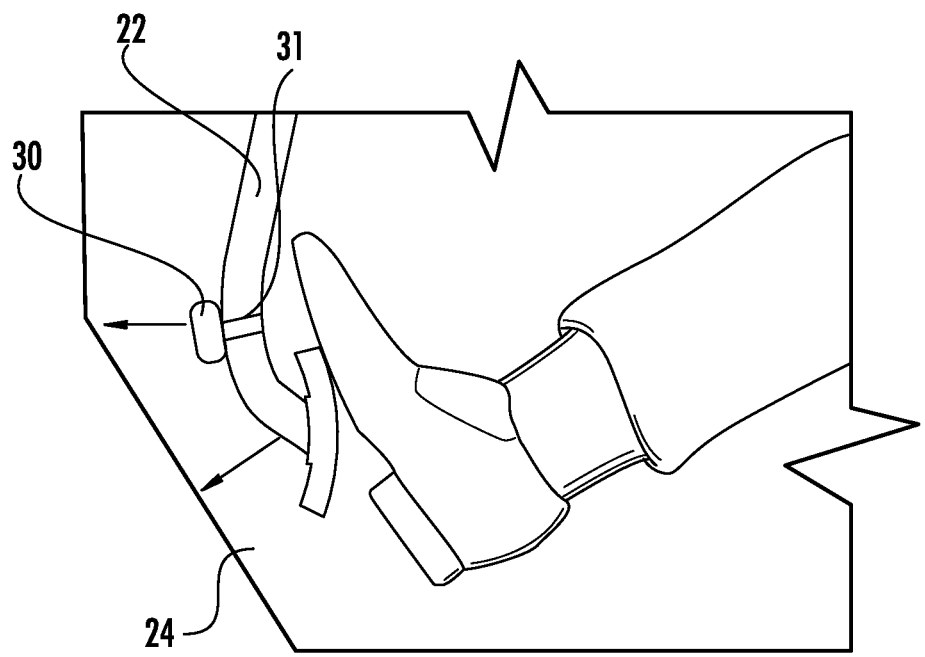
FIG. 2 is a side view of the footwell of the vehicle of FIG. 1.
Figure 3:
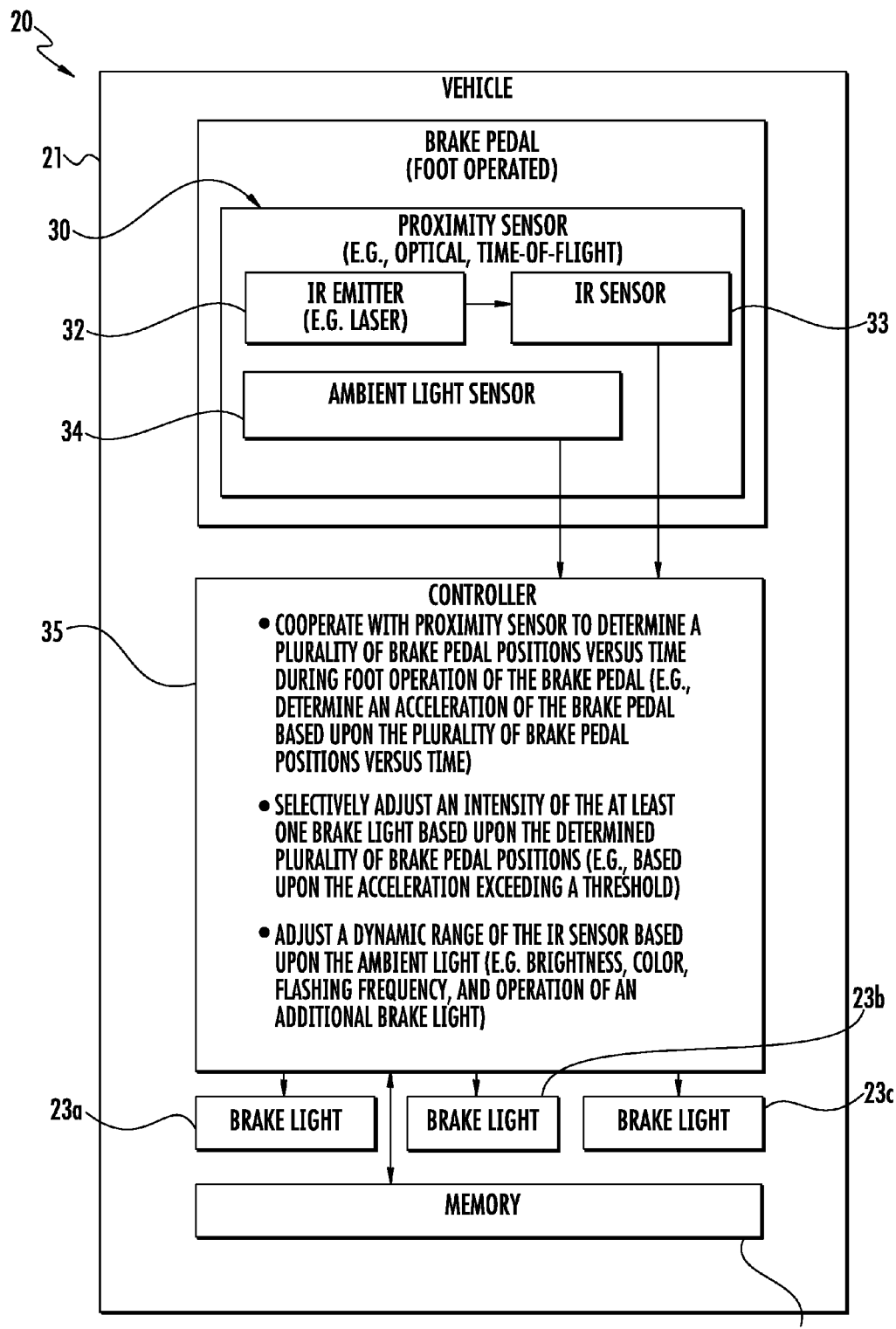
FIG. 3 is a schematic block diagram of a braking intensity indicator system in accordance with an embodiment.

Referring to FIGS. 1-3, a braking intensity indicator system 20 for a vehicle 21 of a type that includes a foot operated brake pedal 22 within a footwell 24 and brake lights 23a-23c. The brake lights 23a-23c are typically carried by the vehicle and are rear facing, with at least one of the brake lights in the rear window. Of course, there may be other arrangements of the brake lights 23a-23c.

Figure 4:
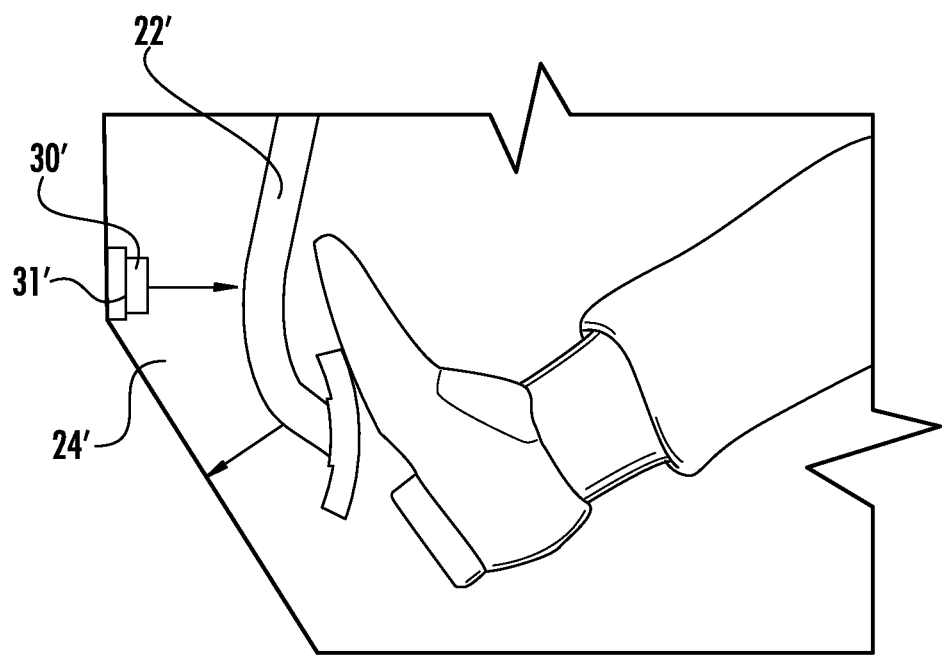
FIG. 4 is a view of a footwell of a vehicle having a braking intensity indicator system according to another embodiment.

The braking intensity indicator system 20 includes a proximity sensor 30 that is associated with the brake pedal 22. The proximity sensor 30 includes a mounting element 31 or bracket for mounting the proximity sensor to the brake pedal 22. Referring briefly to FIG. 4, in another embodiment, the proximity sensor 30' may include a mounting element 31' for mounting in the footwell 24' adjacent the brake pedal 22'.

The proximity sensor 30 may be optical, time-of-flight (ToF), proximity sensor and include an infrared (IR) emitter 32 and an IR sensor 33 configured to receive reflected IR radiation from the IR emitter. The IR emitter may be an IR laser emitter. The proximity sensor 30 may further include an ambient light sensor 34. The proximity sensor 30 may be accurate to within ±5 mm, for example.

In particular, the proximity sensor 30 may be a VL6180 or VL6180x available from STMicroelectronics of Geneva, Switzerland. The VL6180 is a three-in-one sensor module, which may provide increased ease of installation, along with increased precision sensing. The VL6180 three-in-one proximity sensor provides absolute distance to be measured independent of target reflectance. Instead of estimating a distance by measuring light reflected light from an object (which may be significantly reduced by color and surface) the VL6180 more precisely measures the time of flight it takes light to travel to the nearest object. Of course, the proximity sensor 30 may be another type of proximity sensor.

The braking intensity indicator system 20 also includes a controller 35 carried by the vehicle 21 and coupled to the proximity sensor 30. The controller 35 may be circuitry that is part of a device installed in the vehicle, for example, aftermarket, or may be an existing vehicle computer, for example, for processing other vehicle functions, or a combination of existing and aftermarket vehicle devices.

The controller 35 cooperates with the proximity sensor 30 to determine brake pedal positions versus time during foot operation of the brake pedal 22. In other words, the position of the brake pedal 22 may be determined at different times throughout foot operation of the brake pedal. Additionally, the controller 35 may determine a distance traveled of the brake pedal 22 during foot operation.

The controller 35 selectively adjusts an intensity of the brake lights 23a-23c based upon the determined plurality of brake pedal positions versus time. In other words, the controller 35 may adjust the intensity of the brake lights 23a-23c based upon the distance traveled of the brake pedal during foot operation. The controller 35 may also adjust the intensity of the brake lights 23a-23c based upon a position of the brake pedal 22, for example, how far the brake pedal has been depressed over time.

In some embodiments, the controller 35 may alternatively or additionally determine an acceleration of the brake pedal 22 based upon the brake pedal positions versus time. The controller 35 selectively adjusts the intensity of the brake lights 23a-23c based upon the determined acceleration, for example, when the determined acceleration exceeds a threshold.

The controller 35 may selectively adjust the intensity of the brake lights 23a-23c any of adjusting a brightness (e.g. increasing a voltage or operating additional lights within the same brake light housing), changing a color, changing a flashing frequency (e.g., flash more quickly based upon a harder and/or quicker operation of the brake pedal 22, and/or switch between solid and flashing modes) and operating an additional brake light (e.g., within a same brake light housing or remote therefrom). Of course, other and/or additional techniques may be used to adjust the intensity of the brake lights 23a-23c.

Of course, while the braking intensity indicator system has been described with respect to a vehicle having three brake lights 23a-23c, it should be understood that there may any number of brake lights, including one. Moreover, it should be understood that any one of the brake lights may be selectively adjusted independently of other brake lights, or any number may be selectively adjusted as a group.

A memory 36 may be coupled to the controller 35 for storing, for example in a look-up table, corresponding intensities and accelerations. In other embodiments, the controller 35 may process an exception code that may be handled with a corresponding intensity. For increased accuracy, for example, the controller 35 may also adjust the dynamic range of the IR sensor 33 based upon the ambient light. The memory 36 may also store historical data, for example, operational patterns of the brake pedal 22, which can also be used to selectively adjust the intensity. The operational patterns may also be used to determine the efficiency of the braking system and when vehicle maintenance should be performed, for example, replacing the brakes.

As will be appreciated by those skilled in the art, using the brake pedal positions to selectively adjust the intensity of the brake lights 23a-23c may be particularly advantageous for a driver's intent, for example, whether the brake pedal is being operated quickly, and/or being pressed hard (i.e., when a driver "slams" on the brakes). The corresponding varying intensity may be helpful for other drivers and may reduce rear-end collisions, for example. Additionally, the braking intensity indicator system 20 may be particularly advantageous with respect to other systems as the determined acceleration is independent from the vehicle. For example, an accelerometer placed in the vehicle also takes into account acceleration of the vehicle. The braking intensity indicator system 20, particularly the use of the proximity sensor 30 described herein, allows for the acceleration of the brake pedal 22 to be determined independent of the vehicle 21.

A method aspect is directed to a method of selectively adjusting an intensity of at least one brake light 23a-23c of a vehicle 21. The method includes using a controller 35 to cooperate with a proximity sensor 30 associated with a foot operated brake pedal 22 of the vehicle 21 to determine a plurality of brake pedal positions versus time during foot operation of the brake pedal. The method also includes using the controller 35 to selectively adjust the intensity of the at least one brake light 23a-23c based upon the determined plurality of brake pedal positions versus time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A braking intensity indicator system for a vehicle of a type comprising a foot operated brake pedal and at least one brake light, the braking intensity indicator system comprising:
   a proximity sensor to be associated with the brake pedal; and
   a controller configured to
      cooperate with said proximity sensor to determine a plurality of brake pedal positions versus time during foot operation of the brake pedal, and
      selectively adjust an intensity of the at least one brake light based upon the determined plurality of brake pedal positions versus time.

2. The braking intensity indicator system of claim 1 wherein said proximity sensor comprises an optical proximity sensor.

3. The braking intensity indicator system of claim 1 wherein said proximity sensor comprises an infrared (IR) emitter, and an IR sensor configured to receive reflected IR radiation from said IR emitter.

4. The braking intensity indicator system of claim 3 wherein said IR emitter comprises an IR laser emitter.

5. The braking intensity indicator system of claim 3 wherein said proximity sensor further comprises an ambient light sensor; and wherein said controller is configured to adjust a dynamic range of said IR sensor based upon the ambient light.

6. The braking intensity indicator system of claim 1 wherein said proximity sensor comprises a time-of-flight sensor.

7. The braking intensity indicator system of claim 1 wherein said controller is configured to determine an acceleration of the brake pedal based upon the plurality of brake pedal positions versus time.

8. The braking intensity indicator system of claim 7 wherein said controller is configured to selectively adjust the intensity of the at least one brake light based upon the determined acceleration exceeding a threshold.

9. The braking intensity indicator system of claim 1 wherein said proximity sensor comprises at least one mounting element for mounting to the brake pedal.

10. The braking intensity indicator system of claim 1 wherein said proximity sensor comprises at least one mounting element for mounting in the footwell adjacent the brake pedal.

11. The braking intensity indicator system of claim 1 wherein said controller is configured to selectively adjust the intensity of the at least one brake light by at least one of adjusting a brightness, changing a color, changing a flashing frequency, and operating an additional brake light.

12. A braking intensity indicator system for a vehicle of a type comprising a foot operated brake pedal and at least one brake light, the braking intensity indicator system comprising:
an optical proximity sensor to be associated with the brake pedal; and
a controller configured to
cooperate with said proximity sensor to determine a plurality of brake pedal positions versus time during foot operation of the brake pedal,
determine an acceleration of the brake pedal based upon the plurality of brake pedal positions versus time, and
selectively adjust an intensity of the at least one brake light based upon the determined acceleration.

13. The braking intensity indicator system of claim 12 wherein said proximity sensor comprises an infrared (IR) emitter, and an IR sensor configured to receive reflected IR radiation from said IR emitter.

14. The braking intensity indicator system of claim 13 wherein said IR emitter comprises an IR laser emitter.

15. The braking intensity indicator system of claim 13 wherein said proximity sensor further comprises an ambient light sensor; and wherein said controller is configured to adjust a dynamic range of said IR sensor based upon the ambient light.

16. The braking intensity indicator system of claim 12 wherein said proximity sensor comprises a time-of-flight sensor.

17. A method of selectively adjusting an intensity of at least one brake light of a vehicle, the method comprising:
using a controller to
cooperate with a proximity sensor associated with the foot operated brake pedal of the vehicle to determine a plurality of brake pedal positions versus time during foot operation of the brake pedal, and
selectively adjust the intensity of the at least one brake light based upon the determined plurality of brake pedal positions versus time.

18. The method of claim 17 wherein the proximity sensor comprises an optical proximity sensor.

19. The method of claim 17 wherein the proximity sensor comprises an infrared (IR) emitter, and an IR sensor configured to receive reflected IR radiation from the IR emitter.

20. The method of claim 19 wherein the proximity sensor further comprises an ambient light sensor; and using the controller comprises using the controller to adjust a dynamic range of the IR sensor based upon the ambient light.

21. The method of claim 17 wherein the proximity sensor comprises a time-of-flight sensor.

22. The method of claim 17 wherein using the controller comprises using the controller to determine an acceleration of the brake pedal based upon the plurality of brake pedal positions versus time.

23. The method of claim 22 wherein using the controller comprises using the controller to selectively adjust the intensity of the at least one brake light based upon the determined acceleration exceeding a threshold.

\* \* \* \* \*